US008029895B1

(12) United States Patent
Heysek

(10) Patent No.: US 8,029,895 B1
(45) Date of Patent: Oct. 4, 2011

(54) PAINTER'S TAPE WITH IMPROVED ABSORBENT BARRIER EDGE

(76) Inventor: Marie Heysek, Aurora, OH (US)

( * ) Notice: Subject to any disclaimer, the term of this patent is extended or adjusted under 35 U.S.C. 154(b) by 277 days.

(21) Appl. No.: 12/127,903

(22) Filed: May 28, 2008

Related U.S. Application Data

(63) Continuation-in-part of application No. 11/334,065, filed on Jan. 19, 2006, now Pat. No. 7,622,003.

(51) Int. Cl.
*B32B 7/12* (2006.01)
*B32B 15/04* (2006.01)

(52) U.S. Cl. ......... 428/354; 428/343; 118/504; 118/505

(58) Field of Classification Search ................. 428/40.1, 428/41.7, 41.8, 202, 343, 354, 77–79, 160; 118/504, 505; 7/105; 15/121; 134/9, 122 R, 134/900; 602/46, 57; 132/74.5, 75.6, 76.4
See application file for complete search history.

(56) References Cited

U.S. PATENT DOCUMENTS 3,143,208 A * 8/1964 Sizemore, Jr. .................. 428/43
3,927,669 A * 12/1975 Glatt ............................... 602/47
3,935,758 A * 2/1976 Polzin et al. .................. 156/391
4,033,803 A * 7/1977 Coder ............................. 156/71
4,169,184 A * 9/1979 Pufahl ........................... 428/337
4,773,408 A * 9/1988 Cilento et al. .................. 602/49
4,852,203 A 8/1989 LaBelle
5,330,814 A * 7/1994 Fewell ......................... 428/42.2
5,843,011 A * 12/1998 Lucas ............................. 602/57
6,076,225 A 6/2000 Sorenson
6,362,388 B1 * 3/2002 Lucas ............................. 602/57
6,401,980 B2 * 6/2002 Iggulden ........................ 222/108
6,444,307 B1 * 9/2002 Tuoriniemi ................... 428/343
6,541,089 B1 * 4/2003 Hamerski et al. ............ 428/40.1
6,698,068 B2 * 3/2004 Autterson ..................... 24/16 R
6,828,008 B2 * 12/2004 Gruber .......................... 428/192
2002/0114946 A1 * 8/2002 Nickel .......................... 428/343
2005/0118345 A1 6/2005 Burghoffer

OTHER PUBLICATIONS

U.S. Appl. No. 11/334,065, Heysek.

* cited by examiner

*Primary Examiner* — Callie Shosho
*Assistant Examiner* — Nicholas C Kokkinos
(74) *Attorney, Agent, or Firm* — D. Peter Hochberg; Sean F. Mellino; Daniel J. Smola

(57) ABSTRACT

Painter's tape has an adhesive portion that covers said tape's partial or entire width on only one of its two opposing flat surfaces, an absorbent material layer across all or at least a portion of said width, and a layer of non-porous barrier film covering said absorbent material layer to prevent a passage of paint (fluids).

2 Claims, 2 Drawing Sheets

PAINTER'S TAPE WITH IMPROVED ABSORBENT BARRIER EDGE

RELATED APPLICATIONS

The present application is a Continuation-in-Part of U.S. Ser. No. 11/334,065, which was filed on Jan. 19, 2006, now U.S. Pat. No. 7,622,003. The subject matter of the '065 parent application is incorporated herein as if it is fully rewritten in its entirety.

BACKGROUND OF THE INVENTION

1. Field of the Invention

The present invention relates generally to painting tools and to an edge paint tape having an improved absorbent barrier edge.

2. Description of the Related Art

To achieve a clean, finished look, painters edge with paint before they use rollers, the process of "blocking out" or "edging" generally includes the steps of shielding window panes and corner edges with masking tape, running a putty knife along the inner edge of the tape, applying paint with an edging brush, and allowing the paint to dry before removing the tape. The tape is sealed to prevent paint from oozing outwards onto the panes, the windows and the door frames.

A variety of specialty apparatus is designed for controlling the application of paint to edges, corners, or like margins. These devices have drawbacks that tend to fall into three major categories: (1) are hand-held fixed edger devices that demarcate between those surfaces not and to be painted; (2) are disposable adhesive coverings that dispense from rolls and adhere to edging areas; and (3) are paint applicators that comprise an edging or a guide means thereon. A fourth, novel type is described in a U.S. Ser. No. 11/334,065, the parent application to this filing, now U.S. Pat. No. 7,622,003, in which a fixed edger device is provided with an absorbent tape attached to the edging surface.

A disadvantage to fixed edgers without absorbent tape attached is that the technology still fails to provide clean, efficient edging. A disadvantage of the disposable coverings is that oozing still occurs. A disadvantage to the paint applicators is that they generally fail to provide a painted edge along a very exact locus.

There is still yet a long-felt need for a product that provides the high quality appearance sought for painted surfaces. The present invention improves on disposable coverings: it is masking tape having an improved barrier edge. A search of the prior art did not reveal any patents that read directly on claims of the instant invention; however, the following references are considered related: U.S. Pat. No. 6,076,255 to Sorenson teaches a "paint edger with improved pad and precision positioning adjustment" wherein a plurality of paint pad accessories disclosed therein include foam, porosity, and/or sponge-like pads to prevent spillage, through which paint flows through at a very slow speed; U.S. Pat. No. 4,852,203 to LaBelle discloses a "paint edger for the application of paint" having a cutout for easy removal of a reticulated plastic foam paint pad; and U.S. Publication 2005/0118345 to Burghoffer teaches a "paint edger," wherein applicator pads are separated so that each may be used simultaneously and independently of the other to apply a different color paint to each of two intersecting surfaces. One or more applicator pads co-act with a separator guide blade to enable applying different surface coatings to intersecting surfaces.

The present invention improves on disposable coverings. A roll or strips of adhesive tape are adhered along edges, borders, panes and panels or actual paint edgers or tools prior to painting; however, the improved tape comprises an integral absorbent material portion along its length to further prevent oozing.

SUMMARY OF THE INVENTION

It is therefore an object of the present invention to provide a means to achieve a most clean, finished and professional paint process available.

It is an object to improve the products used to edge with paint. It is more specifically an object to improve the "edge paint tape" used where ceiling meets walls, where walls meet baseboards, and where walls meet window frames, etc.

It is an object to eliminate bleeding that can result from conventional edge paint tapes.

It is an object to provide an edge paint tape comprising an absorbent material portion integral along at least one of its opposing lengths.

It is an object that the absorbent material both absorbs paint and makes travel of paint therethrough more timely.

It is a further object to provide the easily removable edge paint tape on a roller, or in individual strips, whereupon it is dispensed therefrom.

It is envisioned that the present paint edge tape can be manufactured with an improved barrier edge with replaceable tape of an absorbent material to provide a wicking action for paint that may pass an outer edge. The tape is provided with a non-porous barrier film that prevents passage of fluid (paint) which allows the paint to be retained within the tape. In accordance with a preferred embodiment, the removable absorbent tape functions as a secondary seal to prevent smearing or leaking of paint that happens to pass by the flexible outer edge.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

It is envisioned that other styles and configurations of the present invention can be easily incorporated into the teachings in a wide variety of applications. Only one particular configuration is shown and described for carrying out the invention as presented in terms of its preferred embodiment. This reason is for purposes of clarity and disclosure; it is not to be considered a limitation of scope.

1. Detailed Description of the Figures

Figure 1A:
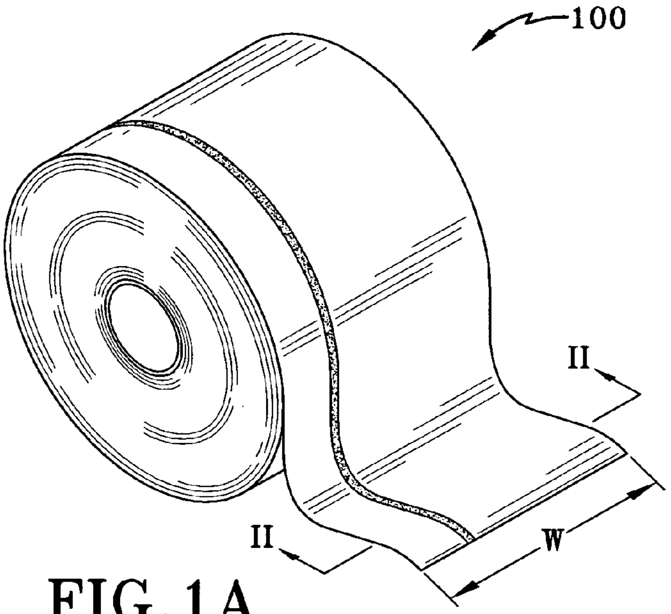
FIG. 1*a* is a roll of edge paint tape in accordance with a preferred embodiment of the present invention.
Figure 1B:
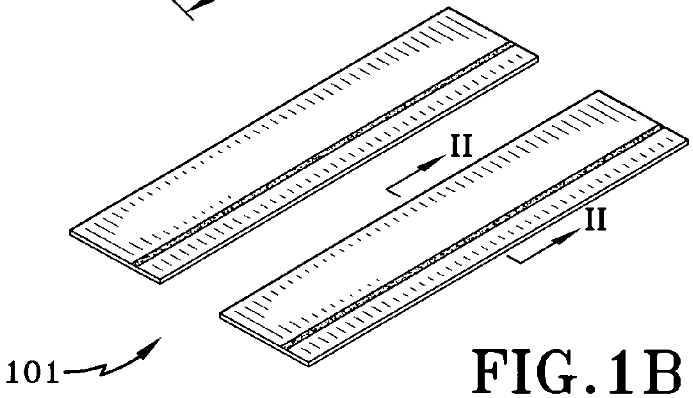
FIG. 1*b* is strips of edge paint tape in accordance with a preferred embodiment of the present invention.
Figure 2:
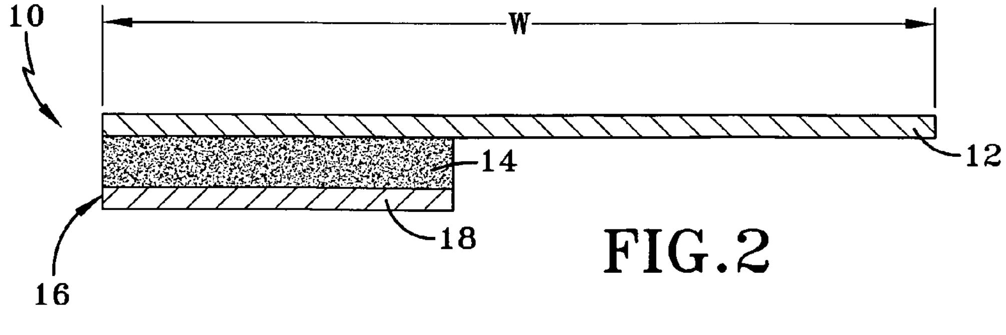
FIG. 2 is a cross-sectional view of the edge paint tape.
Figure 3:
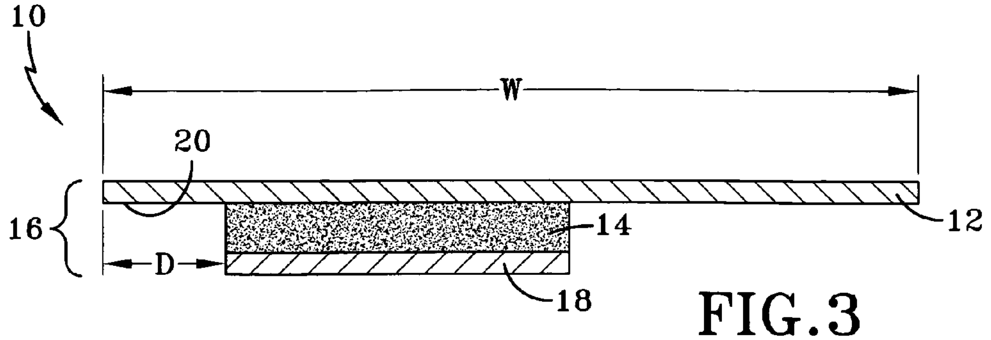
FIG. 3 is a cross-sectional view of an alternative embodiment.

A preferred embodiment of the present paint edge tape 10 is shown in FIGS. 1-3 in accordance with the present invention. The tape is anticipated as being the same as or similar to that used on the "paint edger having improved barrier edge" described in parent U.S. Ser. No. 11/334,065, the subject matter of which is entirely incorporated herein. The paint edge tape 10 comprised in that parent invention is shown herein rolled on a masking roll 100 in FIG. 1*a* or strips 101 in FIG. 1*b* for easy pull and peel disbursement. Occasional perforations may cross its length to effect even easier tearing of the utilized tape from the roll.

FIG. 2 is a side view of a cross section of II-II shown in FIG. 1, i.e., a width W of the tape. The paint edge tape 10 comprises an adhesive portion 12 that covers its entire width W on only one of its two opposing surfaces. It is envisioned that the adhesive portion 12 may alternately cover only a portion of width W for the edger. The absorbent tape can consist of any effective absorbent material as part of the product providing a wicking action for paint (fluids) that may pass the outer edge. Examples of such absorbent material, though not meant to be an exhaustive list, include absorbent paper or low loft, woven or nonwoven materials, paper, fabrics, or gauze-like materials. The adhesive portion 12 adheres to the edger on one surface in an easily removable manner and in a conventional manner known to paint edge tapes and on an opposite or wall-facing surface (when in use); however, an absorbent material 14 is provided across all or at least a portion of that width W on the opposite or wall-facing surface of adhesive portion 12 of tape 10 to provide an absorbent block for paint, stain or any fluid that may seep or leak past the outer edge 16. The absorbent portion 14 is adjacent to the adhesive surface side of the adhesive portion 12. The absorbent material 14 is shown in FIG. 2 to start its travel across the width W at the outer edge 16. The absorbent material 14 travels an entire length of the tape 10. A layer of non-porous barrier film 18 has a first surface which covers the absorbent material 14 to help prevent a passage of fluid (paint) and an opposing surface for engaging the surface being painted. It allows the paint to be retained within the absorbent portion 14 of the tape 10.

In an alternate embodiment shown in FIG. 3, the absorbent material 14, and the non-porous barrier film 18 that covers it, begins its travel across a portion of the width W at a distance D away from the outer edge 16 such that there is a slight clearance between the former and the latter. In this manner, a bottom strip 20 of adhesive material 12 (also known herein as the "inner edge") is exposed along the length of tape 10 so that a putty knife can be run along it to further ensure the tape's removable securement to the wall.

2. Operation of the Preferred Embodiment

Figure 4:
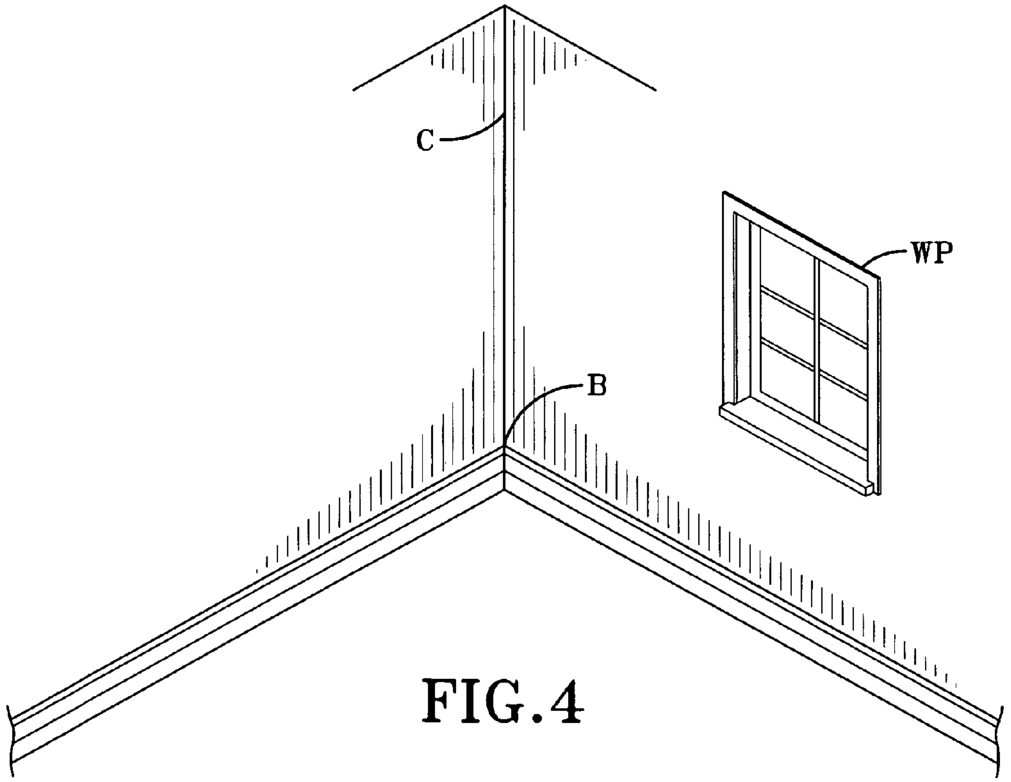
FIG. 4 is an operation of the edge paint tape.

An operation of the present invention is shown in the room of FIG. 4, where the paint tape is applied directly near the surfaces being painted. A window frame WP, corner edges C where the wall meets the ceiling, and corner edges B where the wall meets the baseboard are shown in FIG. 4. The edge paint tape is masked around the window frame WP and along the corner edges C where the wall meets the ceiling and the corner edges B where the wall meets the baseboard. The appropriate length of paint edge tape is torn off a roll and the adhesive side is adhered to those edges. Alternately, a putty knife can be pressed along the inner edge length to further seal the tape to the wall. The absorbent tape prevents bleed-through while painting, staining or any similar application requiring absorbent protection, and can be used on painter's tools, artist's tools or any surface needing protection. After the paint dries, the disposable tape is removed and discarded.

The foregoing descriptions of specific embodiments of the present invention are presented for purposes of illustration and description only. They are not intended to be exhaustive nor to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and the embodiments with various modifications as are suited to the particular use contemplated. It is intended that the scope of the invention be defined by the claims appended hereto and to their equivalents. Therefore, the scope of the invention is to be limited only by the following claims.

Having thus described the invention what is claimed as new and desired to be secured by Letters Patent is as follows:

1. A painter's tape for preventing paint from seeping from a paint guide edge over an edge line on a surface being painted, said painter's tape comprising:

a flat adhesive layer having a width, a first edge and an opposite edge, and a pair of opposing flat surfaces on opposite sides of said adhesive layer, one of said flat surfaces being a wall-facing surface, and the other of said flat surfaces being a support surface for being attached to an edger, with one of said edges extending in a path along the edge line on the surface to be painted;

an absorbent material layer having a first surface attached to said wall-facing surface of said adhesive layer for absorbing paint to prevent the paint from seeping through the edge line, and a second surface opposite said first surface; and a non-porous barrier layer attached to said second surface of said absorbent material layer for preventing paint from flowing from said absorbent material layer, said barrier layer having a first surface in engagement with said second opposing surface and an opposing free surface;

said adhesive layer, said absorbent material layer and said non-porous barrier layer being parallel, where paint is applied to the paint guide edge, with any paint which otherwise would have seeped over the edge line being absorbed in said absorbent material layer and being retained thereon by said non-porous barrier layer;

wherein said absorbent material layer and said non-porous barrier layer have a first pair of aligned edges located in an imaginary plane perpendicular to said adhesive layer and being proximal said first edge of said adhesive layer and a second pair of aligned edges being spaced from said first edge.

2. A painter's tape for preventing paint from seeping from a paint guide edge over an edge line on a surface being painted, said painter's tape comprising:

a flat adhesive layer having a width, a first edge and an opposite edge, and a pair of opposing flat surfaces on opposite sides of said adhesive layer, one of said flat surfaces being a wall-facing surface, and the other of said flat surfaces being a support surface for being attached to an edger, with one of said edges extending in a path along the edge line on the surface to be painted;

an absorbent material layer having a first surface attached to said wall-facing surface of said adhesive layer for absorbing paint to prevent the paint from seeping through the edge line, and a second surface opposite said first surface; and a non-porous barrier layer attached to said second surface of said absorbent material layer for preventing paint from flowing from said absorbent material layer, said barrier layer having a first surface in engagement with said second opposing surface and an opposing free surface;

said adhesive layer, said absorbent material layer and said non-porous barrier layer being parallel, where paint is applied to the paint guide edge, with any paint which otherwise would have seeped over the edge line being absorbed in said absorbent material layer and being retained thereon by said non-porous barrier layer;

wherein said absorbent material layer and said non-porous barrier layer have a first pair of aligned edges located in an imaginary plane perpendicular to said adhesive layer and being spaced from said first edge of said adhesive layer and a second pair of aligned edges being spaced from said opposite edge;

wherein said absorbent material layer and said non-porous barrier layer have widths, said widths respectively being less than said width of said adhesive layer.

* * * * *